April 15, 1958     A. C. SAMPIETRO     2,830,860
PISTON AND CONNECTING ROD ASSEMBLY
Filed Dec. 7, 1955     2 Sheets-Sheet 1
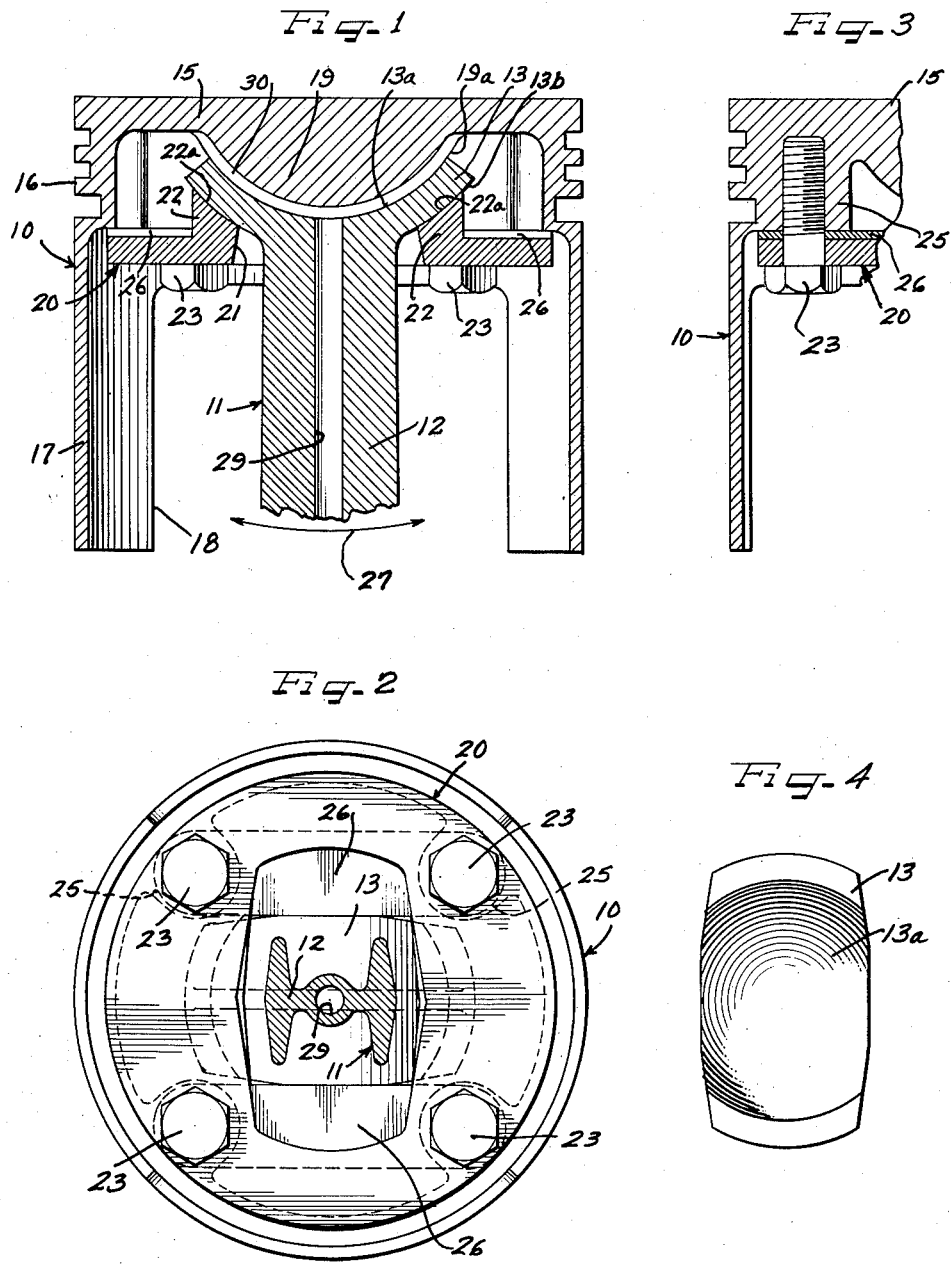
Inventor
ACHILLES CHARLES SAMPIETRO April 15, 1958 — A. C. SAMPIETRO — 2,830,860
PISTON AND CONNECTING ROD ASSEMBLY
Filed Dec. 7, 1955 — 2 Sheets-Sheet 2

Inventor
ACHILLES CHARLES SAMPIETRO

2,830,860

PISTON AND CONNECTING ROD ASSEMBLY

Achilles Charles Sampietro, Detroit, Mich., assignor to Thompson Products, Inc., Cleveland, Ohio, a corporation of Ohio Application December 7, 1955, Serial No. 551,560

10 Claims. (Cl. 309—20)

This invention relates to improvements in internal combustion engines or the like, and more particularly to improvements in piston and connecting rod assemblies. Specifically, the piston and connecting rod assembly of the instant invention is useful in internal combustion engines, although other uses and purposes may be apparent to one skilled in the art.

Heretofore, it is known that a normal piston is attached to a connecting rod by a piston pin, which is carried in bosses extending downwardly toward the crank shaft from the piston ring belt. The dimensions of the engine, along the cylinder axis are governed by the necessity of clearing the crank shaft counterweights with a piston when the piston is at lower dead center. Piston skirts can and have been cut away, and the counterweights can be cam-shaped, but whatever is accomplished the piston pin bosses must be cleared. Further to avoid excessive side thrust, the ratio of center to center length of a connecting rod to stroke should be over 2 to 1. Practical considerations of cost and weight force designers to compromise, and ratios smaller than 2 to 1 are commonly used with losses of mechanical efficiency and engine life. Further, the heavy concentration of loads at the piston pin bosses tend to deform the piston out of round. To avoid these difficulties, various designs have been proposed in the use of different types of joints in place of the piston pin and boss arrangement, but none have completely and satisfactorily answered all of these problems.

In the present invention, these difficulties have been overcome, wherein a spherical joint is provided between the piston and connecting rod. In one embodiment, a spherical surface is provided at the underside of the piston head for receiving a complementally formed spherical contacting surface of a connecting rod head. The connecting rod head is elongated and inserted through a slotted retainer ring, rotated about 90°, and held in place by a pair of straps. The retainer is bolted to the piston head. In another embodiment, the retainer is integrally formed with the piston head, and after the elongated connecting rod head is inserted through the slotted portion of the retainer, a pair of pins are provided to lock the connecting rod head against relative rotation with respect to the piston thereby providing a proper joint.

Accordingly, it is an object of this invention to provide an improved piston and connecting rod assembly.

Another object of this invention resides in the provision of a piston and connecting rod assembly, wherein a spherical joint is employed.

Still another object of this invention is in the provision of a piston and connecting rod assembly, wherein the underside of a piston head is provided with a finished spherical projection, and the connecting rod is provided with a spherical head portion for mating with the piston head spherical portion.

A further object of this invention is in the provision of a piston and connecting rod assembly having a convex spherical projection at the underside of the piston head mating with a concave spherical head portion of a connecting rod, and retaining means for holding the connecting rod and piston in joint assembly.

A still further object of this invention resides in the provision of a piston and connecting rod assembly having a spherical joint between the connecting rod and piston that is held together by a bayonet locking arrangement.

Another object of this invention is to provide a piston and connecting rod assembly including a piston having a convex spherical projection at the underside of the piston head, a connecting rod having an elongated head portion with a concave spherical surface for mating with the convex spherical surface of the piston a removable slotted retainer ring for receiving the connecting rod head in bayonet locking position and adapted to be bolted to the piston head, and a pair of locking straps for preventing the relative rotation between the piston and connecting rod.

A still further object of this invention is to provide a piston and connecting rod assembly including a piston having a convex spherical projection at the underside of the piston head, an integral retaining means with a slot therein, a connecting rod having an elongated head portion with a concave spherical surface to be received in the slot of the retainer portion of said piston and rotated 90° for bayonet locking arrangement therewith, and means for preventing relative rotation between the connecting rod and piston.

A further object of this invention resides in the provision of a piston and connecting rod assembly having a simple and light construction and a longer effected center to center distance of connecting rod to stroke.

Another object of this invention is to provide a piston and connecting rod assembly, wherein the joint between the relatively movable members is cooled and lubricated.

Another object of the invention is to provide a piston and connecting rod assembly which will enable the design of an engine to be more compact while at the same time providing a longer effective center to center distance of connecting rod thereby precluding the sacrifice of mechanical efficiency and engine life.

A further object of this invention is to provide a piston and connecting rod assembly, wherein the piston pressure is transmitted directly to the connecting rod thereby decreasing the tendency of the ring belt to deform out of round.

A still further object of this invention is to provide a piston and connecting rod assembly wherein the overall dimension is reduced while still providing a longer effective center to center length of the connecting rod.

Other objects, features, and advantages of the invention will be apparent from the following detailed disclosure taken in conjunction with the accompanying sheets of drawings, wherein like reference numerals refer to like parts, which On the drawings:

Figure 1 is a fragmentary axial sectional view taken through a piston and connecting rod assembly constructed in accordance with the principles of the invention;

Figure 2 is a bottom plan view of Figure 1 with the connecting rod taken in transverse section;

Figure 3 is a fragmentary cross sectional view of a detail of the connection between the retaining ring and the piston head;

Figure 4 is a top plan view of a connecting rod head employed in the invention;

As shown on the drawings:

Referring particularly to Figures 1 to 6, a piston and connecting rod assembly is illustrated including generally a piston 10 and a connecting rod 11.

Figure 6:
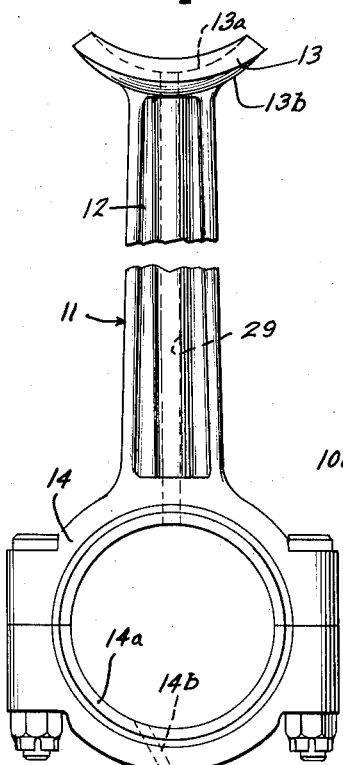
Figure 6 is a side elevational view, partially broken and somewhat reduced of a connecting rod having a head portion constructed in accordance with the principles of the invention.

As seen most clearly in Figure 6, the connecting rod 11 includes an elongated shank 12 of substantially I-beam cross-section. At the upper end of the shank 12, a connecting rod head 13 is formed having an upper concave spherical contact face 13a and a lower concentric convex spherical contact face 13b. This connecting rod head 13 is elongated or substantially rectangular in shape as seen most clearly in Figure 4. It may be noted that the major axis of the head 13, in this instance, is coincident with a major axis of the I-beam shaped shank 12, although it may be appreciated that these axes may be angularly related. At the lower end of the connecting rod shank 12 or at the opposite end from the connecting rod head 13, a conventional split bearing connecting portion 14 is provided. The connecting end 14 of the connecting rod is formed to be connected to a crank shaft of an internal combustion engine.

Referring now to the piston 10, as seen most clearly in Figures 1 to 3, it is seen that the piston includes a piston head 15, a ring belt 16, and a piston skirt 17. The piston skirt 17 is cut away at diametrically opposite points as indicated at 18 to provide the necessary clearing of the crank shaft counterweights. At the underside of the piston head 15 is a downwardly extending projection 19 having a spherical contacting surface 19a. The projection 19, is centered with respect to the piston head 15. The convex spherical surface 19a is preferably formed around a center point located above the piston head and is adapted to be slidably engaged by the spherical surface 13a of the connecting rod head end 13.

A retainer ring 20 of disk-shape is employed to hold the connecting rod and piston together and to provide a bearing surface for the convex spherical surface 13b on the connecting rod head end 13. As seen more clearly in Figure 5, with some reference to Figure 1, it may be seen that the retainer ring has a diametrically extending slot 21, and a pair of oppositely aligned upstanding ribs 22, along opposite sides of the slot 21. The ribs 22 face along a diameter of the retainer ring, and have equal portions on the opposite sides of this diameter. The upper ends of the ribs terminate in concave spherical bearing surfaces 22a, 22a for receiving and engaging the convex spherical contacting face 13b of the connecting rod head end 13.

The retainer 20 is held in place with respect to the piston 10 by a plurality of bolts 23 which extend through suitable apertures 24 in the retainer ring and are threadedly received in tapped bosses 25 circumferentially spaced along the inner wall of the ring belt 16 and adjacent the piston head 15. The apertures 24 in the retaining ring of course register with the tapped holes in the bosses 25. To prevent relative rotation between the piston 10 and the connecting rod 11, a pair of straps 26, suitably apertured at each end to be received on the shanks of the bolts 23, substantially abut against the opposite sides of the connecting rod head end 13, as seen most clearly in Figure 2.

In assembly of the connecting rod 11 with the piston head, the slot in the retaining ring 20 is aligned with the head end of the connecting rod, and the retaining ring is slid onto the rod. The rod and retaining ring are relatively rotated substantially 90° to more or less define a bayonet locking arrangement therebetween, as seen most clearly in Figure 2. Then the retaining ring bolts 23 are associated with the retaining ring, and the locking straps 26 are placed in position on the bolts. The bolts 23 are then screwed into the tapped bosses on the piston to unite the assembly. In position, the convex face 19a of the piston head projection 19 mates with the concave spherical surface 13a of the connecting rod head end 13, while the convex surface 13b of the connecting rod head end engages the concave surfaces 22a of the upstanding ribs 22 on the retaining ring 20. The normal movement between the connecting rod and piston during the operation of an internal combustion engine will be in the directions indicated by the arrows on line 27 in Figure 1 in regard mainly to the connecting rod 11. It may be noted that the slot 21 in the retaining ring 20 has slanted sides to more easily accommodate the movement of the connecting rod 11.

For purposes of lubricating the spherical surfaces of the connecting rod and piston, a scoop 28 is provided on the bottom half of the bearing 14 of the connecting rod, as seen most clearly in Figure 6, to scoop lubricant from the crank case of the engine, and direct it to an annular groove 14a in the bearing through a passageway 14b. Alternatively, the big end bearing may be fed from the crank shaft lubrication holes. The annular groove 14a communicates at its upper end with a longitudinal bore 29 extending through the shank 12 of the connecting rod. The upper end of the bore 29 leads to the concave spherical face 13a of the connecting rod head end 13, and registers in communication with a groove 30 on the convex spherical surface 19a of the projection 19. Thus, oil is transferred from the crank case to the spherical joint to be distributed along the groove 30. The lubricant further serves to cool the piston head 15, which of course, is constantly subjected to high temperature explosions in the combustion chamber of the engine.

Figure 5:
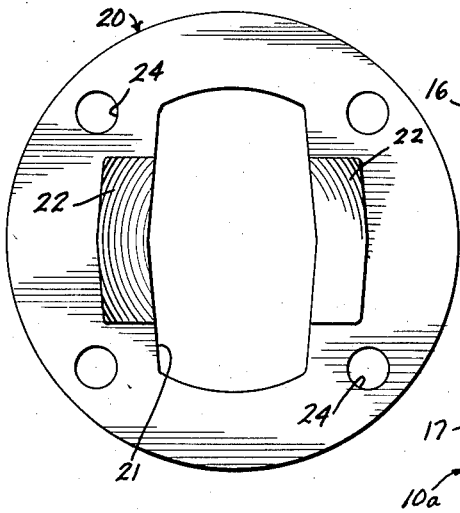
Figure 5 is a top plan view of a retainer ring of the embodiment in Figure 1 removed from the assembly for purposes of clarity.
Figure 7:
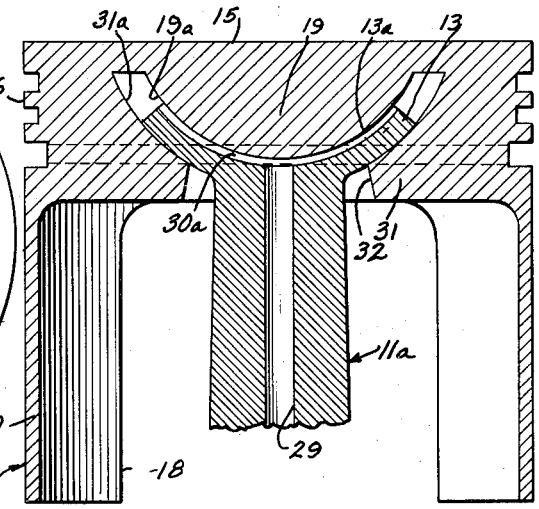
Figure 7 is an axial sectional view of a modified piston and connecting rod assembly constructed in accordance with the principles of the invention.
Figure 8:
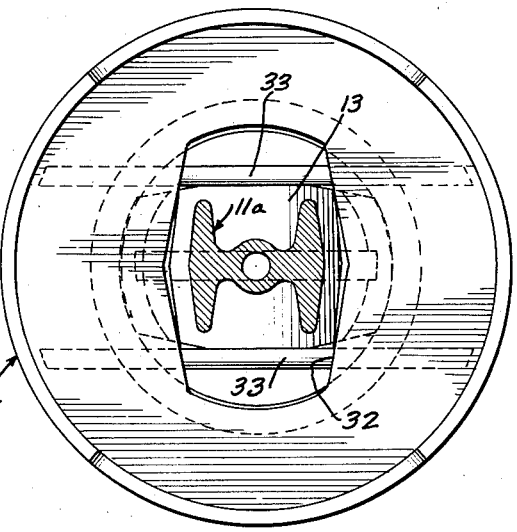
Figure 8 is a bottom plan view of Figure 7 and showing the connecting rod shank in transverse section.

Referring now to Figures 7 and 8, a modification of the invention is illustrated, which differs primarily in having an integral retaining ring carried by the piston. In this embodiment, the assembly includes a piston 10a and a connecting rod 11a. The connecting rod 11a is substantially identical with the connecting rod 11 in the first embodiment. However, in lubricating the joint, a groove 30a is provided in the concave spherical contacting face 13a of the connecting rod end 13. It is to be understood that where possible, like reference numerals will be employed to indicate like parts with respect to the embodiment in Figure 1.

In this embodiment, the retaining means is integrally formed with the piston, wherein an enlarged cylindrical section 31 is carried within the piston ring belt 16, and is provided with a pair of concave spherical contacting faces 31a concentric to the contacting face 19a of the projection 19. An elongated slot 32, as seen most clearly in Figure 8, is provided and aligned on a diameter of the piston retaining means. In this instance, the head end of the connecting rod is aligned and inserted in the slot 32, rotated 90° to the position as shown in Figure 7, and a pair of retaining pins 33, 33 are received in transverse bores of the piston to lock a connecting rod against relative rotation with a piston. As seen in Figure 8, the pins 33 abut against the opposite sides of the connecting rod head end 13. The bores receiving the pins, will, of course, be drilled completely through the thickened portion 31 of the piston in a suitable position. In other words, the piston 10a and the connecting rod 11a are held together in bayonet locking relationship.

From the foregoing, it will be seen that a piston and connecting rod assembly is provided of more compact construction, of simpler and lighter construction, and having a longer effective center to center distance of connecting rod thereby enabling the design of an engine to be more compact without sacrificing losses of mechanical efficiency and engine life.

It will be understood that modifications and variations may be effected without departing from the scope of the novel concepts of the present invention, but it is understood that this application is to be limited only by the scope of the appended claims.

I claim as my invention:

1. A piston and connecting rod assembly including a piston having a piston head, an enlargement integrally formed with the underside of said piston head, said enlargement having a spherical surface, a connecting rod having a head carried thereby, said connecting rod head being elongate and having a concave spherical contact face for engagement with said piston head enlargement and its concentric convex spherical contact face, retaining means carried by said piston head for receiving said connecting rod head and for engaging said convex spherical contact face, and means integrally formed with said retaining means for preventing relative rotation between said rod and piston.

2. A piston and connecting rod assembly adapted for use in internal combustion engines or the like which comprises a piston having a piston head, a protruding bearing member integrally formed with the underside of the piston head having a convex spherical surface, said spherical surface formed around a center point located above said piston head, retaining means carried by said piston head having a diametrically positioned slot therein and a concave spherical contacting surface concentrically spaced from said bearing member surface, a connecting rod having a head on one end thereof, said connecting rod head being elongate and formed to be received in said retaining means slot, concentric concave spherical and convex spherical contact surfaces on said head to coact respectively with said convex spherical bearing member surface and said concave spherical retaining means surface, said rod head being received within said retaining means slot and rotated generally 90° and means integrally formed with said retaining means for preventing relative rotation between said piston and rod.

3. A piston and connecting rod assembly adapted for use in internal combustion engines or the like which comprises a piston having a piston head, a protruding bearing member integrally formed with the underside of the piston head having a convex spherical surface formed around a center point located above said piston head, retaining means secured to the underside of said piston head having a diametrically positioned slot therein and a concave spherical contacting surface concentrically spaced from said bearing member surface, a connecting rod having a head on one end thereof, said connecting rod head being elongated and formed to be received in said retaining means slot, the concentric concave spherical surface on said connecting rod head to coact respectively with said convex spherical bearing member surface on said piston head and said concave spherical retaining means surface, said connecting rod head being received within said retaining means slot and rotated generally 90°, means embodied with said retaining means for preventing relative rotation between said piston and rod, and a bore extending through the shank of said connecting rod adapted to receive a lubricant direct from the crank case of the engine for simultaneously lubricating and cooling said spherical concave and convex bearing surfaces and cooling of the underside of said piston head.

4. A piston and connecting rod assembly adapted for use in internal combustion engines or the like which comprises a piston having a piston head, a protruding bearing member integrally formed with the underside of said piston head having a convex spherical surface, retaining means secured to the underside of said piston head having concave spherical contacting faces concentric with said convex spherical face and a bayonet slot, a connecting rod having a connecting rod head on one end thereof adapted to be associated with said piston head, said connecting rod head having concentric concave and convex spherical contact faces and shaped to be received in said bayonet slot for locking relationship therewith, and means integrally formed with said retaining means for preventing relative rotation of said assembled piston and connecting rod.

5. A piston and connecting rod assembly adapted for use in internal combustion engines or the like which comprises a piston embodying a piston head, a convex spherical contacting face integrally formed on the underside of said piston head, said spherical face formed around a point located above said piston head, removable retaining means on said piston head having a concave spherical contacting face portion concentric with said convex spherical face and embodying a bayonet slot, a connecting rod having a head on one end thereof adapted to be associated with said piston head, said connecting rod head having a concentric concave spherical contact face and shaped to be received in said retaining means bayonet slot for locking relationship therewith, and means integrally formed with said retaining means for preventing relative rotation of said assembled piston and connection rod.

6. A piston and connecting rod assembly adapted for use in internal combustion engines or the like which comprises a piston, said piston embodying a piston head, a convex spherical contacting face on the underside of the head of said piston head, retaining means attached to said piston head and having concave spherical contacting faces concentric with said convex spherical face and a bayonet slot, a connecting rod having a head on one end thereof adapted to be associated with said piston, said connecting rod head having concentric concave and convex spherical contact faces and shaped to be received in said retaining means bayonet slot for locking relationship therewith, and means integrally formed with said retaining means for preventing relative rotation of said assembled piston and connecting rod, a transverse groove on said piston head convex spherical contacting face, and a bore in said connecting rod communicating with said groove and being adapted to receive a lubricating fluid direct from the crank case of the engine to lubricate and cool the contacting surfaces of said piston and rod and cool the underside of said piston head.

7. A piston and connecting rod assembly adapted for use in internal combustion engines or the like which comprises a piston, said piston embodying a piston head, a convex spherical contacting face on the underside of said piston head, retaining means integrally formed with said piston head and having concave spherical contacting faces concentric with said convex spherical face and a bayonet slot, a connecting rod having a head on one end thereof adapted to be associated with said piston, said connecting rod head having concentric concave and convex spherical contact faces and shaped to be received in said retaining means bayonet slot for locking relationship therewith, and means embodied with said retaining means for preventing relative rotation of said assembled piston and connecting rod, a transverse groove in said convex spherical contacting face of said piston head, and a bore in said connecting rod communicating between said groove and the other end of said connecting rod and being adapted to receive a lubricating fluid direct from the crankcase of the engine to lubricate and cool the contacting surfaces of said piston head and said connecting rod head.

8. A piston and connecting rod assembly including a piston having a piston head, an enlargement integrally formed with the underside of said piston head, said enlargement having a spherical surface, said spherical surface formed around a center point located above said piston head, a connecting rod having a head carried thereby, said connecting rod head being elongated and having a concave spherical contact face for engagement with said piston head enlargement and its concentric convex spherical contact surface, retaining means carried by the underside of said piston head for receiving said connecting rod head and for engaging said convex spherical contact face, and said retaining means of desired configuration and embodying means for preventing relative rotation between said rod and piston.

9. A piston and connecting rod assembly embodying a spherical joint between the piston and connecting rod including a piston having a piston head, an enlargement integrally formed with the underside of said piston head, said enlargement having a concentric convex spherical face, a connecting rod having a head carried thereby, said connecting rod head having a concave spherical contact face for engagement with said piston head enlargement and its concentric convex spherical contact face, retaining means carried by the underside of said piston head for receiving said connecting rod head for engaging said convex spherical contact face, and said retaining means of desired configuration and embodying means for preventing relative rotation between said rod and said piston.

10. A piston and connecting rod assembly adapted for use in internal combustion engines embodying a crank case and including a piston having a piston head, an enlargement integrally formed with the underside of said piston head, said enlargement having a spherical face, said spherical face formed around a center point located above said piston head, a connecting rod having a head carried thereby, said connecting rod head having a concave spherical contact face for engagement with said piston head and its concentric convex spherical contact face, said connecting rod embodying a bore extending through the shank thereof and communicating with said connecting rod head concave face, said bore being adapted to receive a lubricant direct from the crank case of the engine to lubricate and cool the contacting surfaces of the spherical joint formed by said piston head and said connecting rod head as well as to cool the underside of said piston head, retaining means carried by the underside of said piston head for receiving said connecting rod head and for engaging said convex spherical contact face, and said retaining means of desired configuration and embodying means for preventing relative rotation between said rod and piston.

References Cited in the file of this patent

UNITED STATES PATENTS

| 1,413,645 | Wiltse | July 25, 1922 |
| 1,597,706 | Aldous | Aug. 31, 1926 |
| 2,304,891 | Dickson | Dec. 15, 1942 |
| 2,720,871 | Morris | Oct. 18, 1955 |

FOREIGN PATENTS

| 587,777 | Great Britain | May 6, 1947 |